US012675100B2

(12) United States Patent
Woll et al.

(10) Patent No.: US 12,675,100 B2
(45) Date of Patent: Jul. 7, 2026

(54) METHOD FOR PRODUCING MATERIAL BOARDS IN A PRODUCTION PLANT, PRODUCTION PLANT, COMPUTER-PROGRAM PRODUCT AND USE OF A COMPUTER-PROGRAM PRODUCT

(71) Applicant: Dieffenbacher GmbH Maschinen- und Anlagenbau, Eppingen (DE)

(72) Inventors: Jürgen Woll, Eppingen (DE); Manuel Steger, Eppingen (DE); Jan Bär, Eppingen (DE); Florian Schleissinger, Eppingen (DE); Patrick Störner, Eppingen (DE)

(73) Assignee: Dieffenbacher GmbH Maschinen-und Anlagenbau, Eppingen (DE)

( * ) Notice: Subject to any disclaimer, the term of this patent is extended or adjusted under 35 U.S.C. 154(b) by 683 days.

(21) Appl. No.: 17/800,569

(22) PCT Filed: Feb. 18, 2021

(86) PCT No.: PCT/EP2021/054022
§ 371 (c)(1),
(2) Date: Aug. 18, 2022

(87) PCT Pub. No.: WO2021/165394
PCT Pub. Date: Aug. 26, 2021

(65) Prior Publication Data
US 2023/0134786 A1      May 4, 2023

(30) Foreign Application Priority Data
Feb. 18, 2020      (DE) .......................... 102020104286.8

(51) Int. Cl.
G05B 19/418           (2006.01)

(52) U.S. Cl.
CPC .................. G05B 19/41875 (2013.01); G05B 2219/32368 (2013.01)

(58) Field of Classification Search
CPC .... G05B 19/41875; G05B 2219/32368; G05B 2219/36039; G05B 2219/36284;
(Continued)

(56) References Cited

U.S. PATENT DOCUMENTS 6,212,438 B1 *   4/2001   Reine ................... G05B 13/042
                                                                  700/47
10,853,728 B1 *   12/2020   Walters .................. G06N 3/084
(Continued)

FOREIGN PATENT DOCUMENTS

CA           2814625          10/2013
DE       112004001694        *  9/2004   ............. G05B 15/02
(Continued)

OTHER PUBLICATIONS

Sola et al., "Importance of Input Data Normalization for the Application of Neural Networks to Complex Industrial Problems", 1997, pp. 1464-1468 downloaded from https://ieeexplore.ieee.org/document/589532 (Year: 1997).*
(Continued)

*Primary Examiner* — Robert E Fennema
*Assistant Examiner* — Olvin Lopez Alvarez
(74) *Attorney, Agent, or Firm* — Volpe Koenig

(57)           ABSTRACT

A method for producing material boards in a production plant in which apparatuses form a material into a mat that is pressed to obtain the material board which has specific quality parameters. The production plant and/or the apparatuses are controlled in an open-or closed-loop manner by a controller, which preferably includes a programmable logic controller, and input parameters are received, processed and/or output by the controller. The input parameters
(Continued)

are formed at least from settable product parameters for the material board to be produced, from settable and/or recorded plant parameters of the production plant and/or the apparatuses and/or from recorded material parameters. A quality value of at least one quality parameter of the material board to be produced is determined based on the input parameters by an algorithm based on artificial intelligence. The algorithm is trained or formed by a database which has at least one quality parameter and input parameters correlating with the quality parameter.

26 Claims, 2 Drawing Sheets

(58) Field of Classification Search
CPC ...... G05B 19/40937; B27N 3/02; B27N 3/04; B27N 1/00; B27N 1/02; B27N 1/029; Y02P 90/02
See application file for complete search history.

(56) References Cited

U.S. PATENT DOCUMENTS

| | | | | |
|---|---|---|---|---|
| 11,181,872 | B1 * | 11/2021 | Herring, III | G05B 13/042 |
| 11,580,379 | B1 * | 2/2023 | Leen | G06F 9/54 |
| 2008/0208487 | A1 * | 8/2008 | Goebel | G06N 3/043 |
| | | | | 702/34 |
| 2013/0103624 | A1 * | 4/2013 | Thieberger | G06N 20/00 |
| | | | | 706/12 |
| 2014/0172382 | A1 * | 6/2014 | Andrews | F17D 5/00 |
| | | | | 703/2 |
| 2017/0109646 | A1 * | 4/2017 | David | G03F 7/70625 |
| 2019/0102678 | A1 * | 4/2019 | Chang | G06V 10/454 |
| 2019/0171187 | A1 * | 6/2019 | Cella | G06N 3/126 |
| 2019/0176425 | A1 | 6/2019 | Dröge | |
| 2020/0042701 | A1 * | 2/2020 | Yang | G06N 3/084 |
| 2020/0125976 | A1 * | 4/2020 | Otano | G06N 3/09 |
| 2020/0309982 | A1 * | 10/2020 | Jin | G01V 1/42 |
| 2020/0380336 | A1 * | 12/2020 | Chowdhury | G06N 3/044 |
| 2020/0402019 | A1 * | 12/2020 | Truong | G06Q 10/1093 |
| 2021/0280091 | A1 * | 9/2021 | Simpson | B25J 11/00 |
| 2021/0339495 | A1 * | 11/2021 | Dröge | B27N 3/24 |

FOREIGN PATENT DOCUMENTS

| | | | | |
|---|---|---|---|---|
| EP | 0875808 | | 11/1998 | |
| EP | 0967325 | B1 * | 6/1999 | D21G 9/00 |
| EP | 0951977 | * | 10/1999 | G05B 3/04 |
| EP | 1700682 | | 9/2006 | |

OTHER PUBLICATIONS

Garcia et al., "Prediction of standard particleboard mechanical properties utilizing an artificial neural network and subsequent comparison with a multivariate regression model", 2008, pp. 178-187, downloaded from https://fs.revistas.csic.es/index.php/fs/article/view/1033/1030 (Year: 2008).*

Peng et al., "Current status of machine prognostics in condition-based maintenance: a review", 2010, pp. 297-313, downloaded from https://link.springer.com/article/10.1007/s00170-009-2482-0 (Year: 2010).*

De melo et al, "Use of Artificial Neural Networks in Predicting Particleboard Quality Parameters" pp. 10, 2016, downloaded from https://www.scielo.br/j/rarv/a/xMP3xctb4csp3g8FR963PRM/?format=html&lang=en (Year: 2016).*

Cook et al, "A Neural Network to Predict Particleboard Manufacturing Process Parameters", 1991, pp. 1463-1478, downloaded from https://academic.oup.com/forestscience/article/37/5/1463/4642112 (Year: 1991).*

Sukru Ozsahin, "Optimization of process parameters in oriented strand board manufacturing with artificial neural network analysis", pp. 769-777, 2013 downloaded from https://link.springer.com/article/10.1007/s00107-013-0737-9 (Year: 2013).*

* cited by examiner

Fig. 2
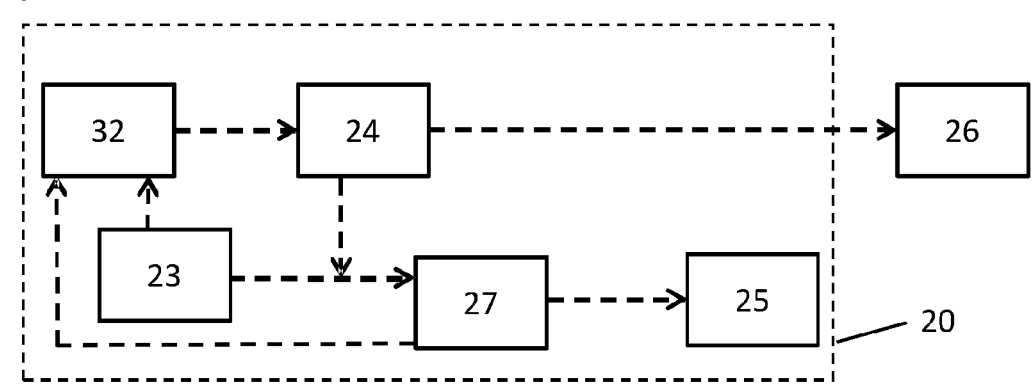
Fig. 3
Fig. 4
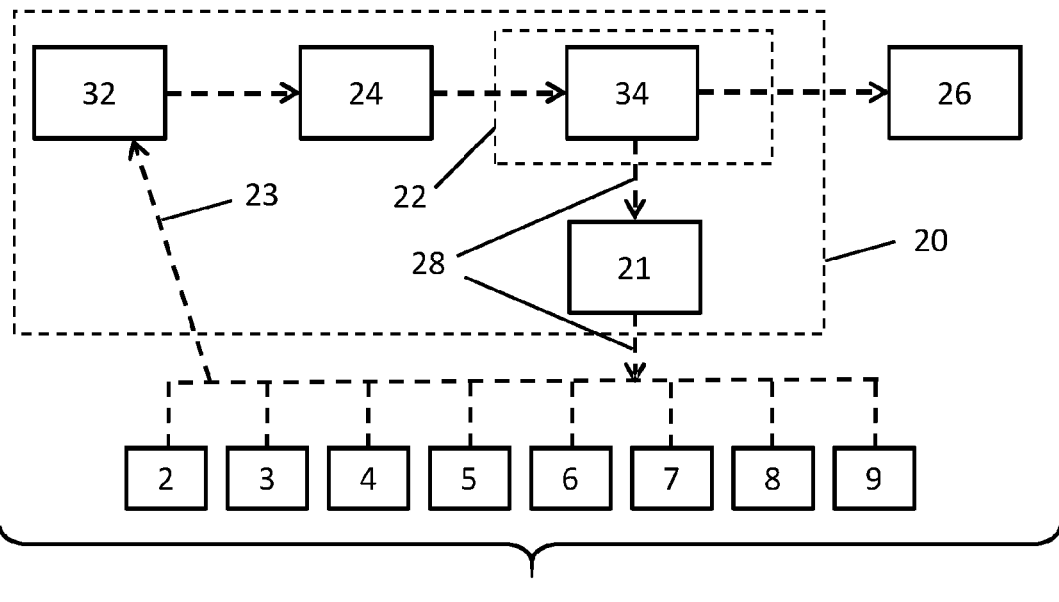

METHOD FOR PRODUCING MATERIAL BOARDS IN A PRODUCTION PLANT, PRODUCTION PLANT, COMPUTER-PROGRAM PRODUCT AND USE OF A COMPUTER-PROGRAM PRODUCT

TECHNICAL FIELD

The invention relates to a method for producing material boards and to a production installation for producing material boards. In addition, the invention relates to a computer program product and to the use of a computer program product.

BACKGROUND

Cycle presses or continuously operating single- or double-band presses are generally used to produce material boards from plastics and/or raw materials based on biological primary materials, such as for example wood or annual and perennial plants. This involves the respective raw material first being conditioned by cleaning and comminuting it, usually drying it and, if necessary, mixing it with a binder in a predefined mix ratio. The binder used is normally a glue applied to the material in a liquid gluing process or in a dry gluing process. The raw material conditioned in this way is subsequently placed or spread in predefined layers and/or basis weight ratios and/or orientations in a spreading apparatus to obtain a mat and is delivered to a press as an apparatus for pressing, the mat being pressed in the press under pressure and with a supply of heat to obtain a material board. In particular, material boards are produced in continuous operation, the mat, to this end, being formed on a continuously revolving forming belt and pressed in a continuously operating press to obtain a material board strand, which is subsequently divided up to obtain material boards.

During production, to increase productivity and adhere to quality, it is desirable to have control of a multiplicity of parameters that include not only the settings for the installation, or the individual machines arranged therein, but also the influence on the material grade and the physical properties of the material board to be produced.

In practice, a scientist with technological experience, in particular a wood technologist, draws on his previous experiences and stipulates the values for the production installation in advance, for example for the amount of binder per unit material, the height and/or the basis weight of the material that is spread to obtain a mat, the pressure and the supply of heat in the press over the period of pressing the mat to obtain the material board, or the material board strand, and also the production speed. Subsequently, he attempts for example to optimize the production speed, the temperature and the pressure, if necessary also the temperature and pressure curves, in the press in order to improve the properties of the material board to be produced and/or to increase the quantity of material boards per unit time. The scientist with technological experience uses actual and measured values from production and then attempts to optimize different variable and alterable parameters of the production installation experimentally and with instinct based on his earlier experiences, in order to ultimately increase the quality of the material board and the quantity or the volume of material boards per unit time.

To ascertain the properties and quality data of a material board, it is known practice to take a laboratory cut from a material board, or a material board strand, and to analyze it using sometimes complex methods in a laboratory on the premises of the production installation or externally. In particular when ascertaining properties of material boards, it can take between several hours and a few days before applicable data relating to quality have been determined for the laboratory cut, for example because the laboratory cut needs to cool or specific measurements require analysis of the laboratory cut over a longer period. The dead time between production of the laboratory cut and ascertainment of the properties of the material board and of quality data is therefore long, which means that there is the risk of rejects being produced over a relatively long period.

Furthermore, it is likewise known practice to make quality predictions by collecting empirical values and a multiplicity of previous production scenarios, which represent in particular data from measurement results before and after the pressing of the material board, and to optimize the setting of the production installation in advance by means of a physical model. The physical model used or else the use of multiple physical models is based on characteristic values, characteristic curves or families of characteristic curves that have been ascertained scientifically or in the course of operation. These metrics are used to describe a physical model by way of mathematical formulae, taking into consideration machine-specific or process-specific characteristics. This may involve reading back not only actual values but also laboratory values and, if necessary, also taking into consideration setpoint values.

Although this principle has proved itself, it suffers from the disadvantage that the values and parameters need to be confirmed manually or by using adaptive methods by inputting proposal values. It has also been found that if there are too many or changing parameters, particularly if they have undergone only little research or their interactions among one another vary, acquisition of the parameters and the effects thereof is reproducible in the physical model only in a complex manner and only with difficulty. In particular, the complexity of the modeling rises exponentially with the parameters to be taken into consideration, which means that this method has a certain set limit.

A disadvantage of this principle is also that the model needs to be matched to the respective production installation, production conditions and in particular the respective product. A large volume of necessary quality data may also be ascertained by means of laboratory testing methods only after production, in particular only after the material board has cooled and residually cured. Miscalculations may already arise here, for example because the data of a "laboratory cut", that is to say of a material board section cut from the product strand specially, may not be a one hundred percent match for the values of a material board that is removed hot. A material board coming to rest in a board stack immediately after exiting the press will, merely as a result of this form of storage, which has a shallower cooling gradient as a result of the stack formation, behave, and in particular cool, differently than a laboratory cut that is kept on its own and then cools quickly.

SUMMARY

The object of the present invention is to specify a method and a production installation for producing material boards, and also a computer program product and the use of a computer program product, that allow quality values in a production installation to be easily ascertained during production of the material boards.

Another object of the present invention is to specify a method and also a production installation for producing material boards and a computer program product that allow reliable forecasting of material board properties in production installations for material boards of any type.

Furthermore, it is another object of the present invention to specify a method and a production installation for producing material boards and also a computer program product that allow optimization of quality parameters during operation.

It is likewise an object of the present invention to specify a method and a production installation for producing material boards and also a computer program product that allow a rapid change of product between material boards of different type and also the production of small series with few rejects.

A change of product in the present case relates to the same or at least a similar starting material being used for the material boards, but the material boards differing in their product parameters, for example the thickness or strength of the material board.

These and other objects are achieved by a method having one or more of the features disclosed herein and by an apparatus having one or more of the features disclosed herein. Other solutions are provided by a computer program product having one or more of the features disclosed herein and by the use of a computer program product having one or more of the features disclosed herein.

Advantageous embodiments of the method and advantageous embodiments of the apparatus are described below and in the claims.

The method according to the invention is in particular designed to be performed on the production installation according to the invention, in particular on an advantageous configuration thereof. The production installation according to the invention is in particular designed to carry out the method according to the invention or an advantageous configuration thereof. The method for producing material boards is in particular a method for process optimization of a production installation for producing material boards. The production installation for producing material boards is in particular an apparatus for process optimization of a production installation for producing material boards.

The method for producing material boards in a production installation involves a material being formed in apparatuses of the production installation to obtain a mat and being pressed to obtain the material board, which has specific quality parameters, wherein the material is preferably glued before being formed to obtain the mat, wherein the production installation and/or the apparatus are controlled or regulated by means of at least one controller, which preferably includes a programmable logic controller, and wherein the controller is used to receive, process and/or output input parameters. Preferably, the mat may also be a web.

The method according to the invention is distinguished in that the input parameters are formed at least from variable product parameters for the material board that is to be produced, from variable and/or acquired installation parameters of the production installation and/or of the apparatuses and/or from acquired material parameters, and in that an algorithm based on artificial intelligence is used to ascertain a quality value of at least one quality parameter of the material board that is to be produced on the basis of the input parameters, the algorithm having been trained, or formed, by means of a database that includes at least one quality parameter and input parameters correlating with the quality parameter.

The invention is substantially based on the insight that the ascertainment of a quality value for at least one quality parameter in the course of the production of material boards allows quality statements to be made at an early stage or, if necessary, measures that reduce material board rejects to be taken quickly. A statement about the quality of the material board produced may thus be made in the course of the production of material boards while operation of a production installation is ongoing. A laboratory cut is therefore ideally no longer necessary in order to ascertain the quality of the material board produced, which means that the number of laboratory cuts may be reduced during quality determination.

Apparatuses of a production installation include apparatuses of the production installation that are used to produce material boards. In particular, they are apparatuses that have a specific assigned task during the production of material boards, for example comminuting material, spreading or pressing the material. Preferably, the apparatuses are individual machines or groups of individual machines.

The algorithm is used to ascertain at least one quality value, quality values preferably being ascertained for multiple quality parameters in order to characterize the material board produced as completely as possible.

The algorithm based on artificial intelligence is trained substantially independently by way of the training using the database. As a result, it is, in particular, possible to dispense with ascertaining a quality value on the basis of a physical model, which means that it is, in particular, substantially possible to dispense with model pre-sets for the algorithm by way of the physical description of specific processes. However, physical models may also be incorporated into the algorithm and for example form a starting point, it being, in particular, possible to dispense with complex matching of the model to the production installation or production conditions. It is thus possible to ascertain the quality values more easily without this requiring the algorithm to be matched to the installation-specific or method-specific circumstances.

An algorithm based on artificial intelligence is understood to mean an algorithm based on methods that are used in the development of artificial intelligence. Advantageously, an algorithm based on artificial intelligence includes or is based on at least one method or a modification thereof from the following groups: simple methods, such as for example linear regression, polynomial regression, functional regression; and/or advanced methods, such as for example random forest regression, support vector regression, K nearest neighbors regression, neural networks, recurrent neural networks, convolutional neural networks, residual networks, Bayesian networks; and/or classification-based methods, such as for example K nearest neighbors classification, decision trees, random forests, naive Bayes, support vector machines.

A simple method, such as for example linear regression, polynomial regression, functional regression, is understood to mean in particular widely used methods that come from the field of statistics and may be used for the purposes of machine learning.

An advanced method, such as for example random forest regression, support vector regression, K nearest neighbors regression, neural networks, recurrent neural networks, convolutional neural networks, residual networks, Bayesian networks, is understood to mean in particular methods that almost exclusively fall within the field of machine learning and are barely relevant outside this domain. Classification-based methods, such as for example K nearest neighbors classification, decision trees, random forests, naive Bayes, support vector machines, may also be regarded as a subgroup of the advanced methods.

As a preference, limits for specific parameters will preferably be predefined for the algorithm besides a mathematical method, in particular with mapping functions and/or neighbor functions, within which limits the algorithm is free to move. By way of example, one or more mapping layers and weighting factors are predefined for a method based on neural networks, the weightings in particular being optimized by way of the training using the database.

Preferably, an artificial neural network is used. The use of an artificial neural network is understood to mean not the use of machine learning that involves a model based on physical values being predefined coherently and then the model parameters being adapted, but rather the use of artificial neural networks that involves parts or the complete algorithm being adapted by way of training methods. One or more layers of an artificial neural network may therefore be defined and/or created and also starting values for the weighting parameters from the previous experiences. The neural networks may also be multilayered and may have different structures. A common feature of them is that no modeling in the actual sense takes place in the design step, but rather a frame structure is merely predefined for how the artificial neural network is designed, and then an optimization algorithm optimizes the parameters. This optimization algorithm requires, or has, no information about the process that is being recreated and merely adapts all of the network parameters such that the output variables for the training data match the predefined target variables as well as possible.

Quality parameters in the present case are properties and/or parameters of the material board produced that may be used to characterize the quality or grade of the material board. Quality parameters for a material board may be for example the strength for a major axis or a minor axis, the transverse tensile strength for a major axis or a minor axis, the modulus of elasticity for a major axis or a minor axis or the surface quality of the material board. Analyses, for example the analysis of a laboratory cut, may be used to determine values of the quality parameters. The algorithm is intended to be used to ascertain quality values for at least one quality parameter, so that better details relating to the quality of the material board produced are rendered possible given a reduced number of laboratory cuts.

Input parameters in the present case are regarded as being all parameters that are automatically or manually incorporated into the control, and thus contribute to ascertaining the quality parameter. The input parameters include product parameters, installation parameters and material parameters. Preferably, the input parameters include only parameters that are relevant to production of the material board and in relation to the material board.

Product parameters are regarded as variable parameters of the material board that are directly or indirectly predefined or are stipulated. In particular, the product parameters may be the type of material board, for example for wooden material boards they may in particular be, in general, chipboards, MDF or OSB or forms thereof, or the thickness, or strength, of the material board.

Installation parameters in the present case are intended to be understood to mean parameters of the entire production installation, or of the individual apparatuses of the production installation, that in particular are stipulated or predefined, input into the controller and/or ascertained by means of sensors. By way of example, the installation parameters are formed by the press length of the apparatus for pressing, by a spreading width in which the mat is spread, by a number of spreading heads for controlling the mat, and by the use and type of preliminary heating for the mat. In addition, the installation parameters may also be the pressing pressure of individual cylinders in the press, the temperature of heating plates, the fill levels of temporary stores or the temperature of a drying stage for drying the material before a mat is formed. The installation parameters may in particular also be setpoint values that are preferably input into the controller or stipulated by a user or a technological employee of the production installation, and actual values measured for example by means of sensors. Consumption values for the production installation or the apparatuses thereof, such as for example power consumption, are also included in the installation parameters. Besides the direct parameters of the production installations and the apparatuses thereof, the installation parameters also include the ambient conditions, such as for example room temperature or air humidity.

Furthermore, material parameters are intended to be understood to mean all parameters of the material used that are known or are also ascertained by means of sensors. For the production of wooden material boards, material parameters are for example the type of wood, the density of the material, the moistness of the material, the composition of the material used, in particular the ratio of fresh and recycling material, the binder used and the amount of binder used, and also the temperature of the material in a temporary store or before entering the press. In particular, the material parameters include parameters of the material that are acquirable in the individual stages of processing of the material from delivery, through the spread mat, to material board. The material parameters may also each include both setpoint values and measured actual values.

Preferably, exact analytical determination of all product properties, including laboratory values, is not necessary for the present purposes, but rather it is in particular sufficient to include only certain product properties.

The individual conveyor apparatuses or other installation components that are part of a production installation, which, although necessary for the production process, have no effect in terms of process economy, are not especially mentioned in the present case, but may be included in the control process. By way of example, the production speed of the press is taken as a basis for adapting and controlling the necessary conveyor and transport installations as appropriate so that the educts or the products are supplied or transported away as appropriate.

One advantageous embodiment of the method provides for the input parameters to be acquired with a time value and/or position value. By acquiring a time value, the input parameters may be attributed to an ascertained quality value, the time value allowing the progress of the material in the production installation to be ascertained. It is therefore also possible for an individual material board to be attributed its underlying input parameters and the ascertained quality value directly. The time value may also include a time range. The time range may be for example the length of time between two times at which the input parameter was acquired. In particular, the input parameter may be substantially unchanged over a time range, or the input parameter may have been averaged.

The position value allows the input parameter to be attributed to a specific position in the production installation and/or in an apparatus thereof, which in particular also allows the progress of the material in the production installation to be ascertained.

Preferably, the input parameters are normalized and/or aggregated. Normalization of the input parameters is intended to allow the most universal possible use of said input parameters for a multiplicity of installations, which means that installation-specific peculiarities may be eliminated. The input parameters are normalized in particular to a statistical mean of zero and a standard deviation of one. Aggregation of the input parameters allows the volume of data for processing to be significantly reduced, which allows faster processing. Particularly preferably, the aggregation is carried out by way of interpolation, extrapolation and/or averaging.

In particular, the input parameters are normalized over time and/or the length of the production installation and/or of an apparatus thereof. This allows other installation-specific influences on the input parameters to be reduced, which means that the data may also be processed immediately.

Alternatively or preferably additionally, the input parameters are aggregated by forming clusters, in particular by forming clusters of input parameters within an apparatus. Multiple input parameters are thus combined in a cluster to obtain a range, which reduces the volume of data further. Particularly preferably, the aggregation is carried out by way of interpolation, extrapolation and/or averaging.

There is the possibility of forming one or more clusters in particular within an apparatus, since a subprocess in the method for producing material boards takes place in an apparatus. By way of example, in a press, as an apparatus for pressing, clusters may be provided by a series of cylinders across and/or along a production direction or else by subdividing a continuous press into an inlet area, a high-pressure area and an outlet area. As another illustration, input parameters may be aggregated for the individual spreading units in the apparatus for spreading comprising multiple individual spreading units. Particularly preferably, the data are aggregated for each apparatus of the production installation.

One preferred embodiment is distinguished in that the database is formed at least from a dataset, wherein the dataset is formed from data relating to the quality parameters and input parameters correlating with the quality parameters. In the case of a database comprising multiple datasets, in particular the datasets of the database differ in at least one quality parameter and/or in at least one input parameter correlating with the quality parameter.

The dataset thus combines firstly data relating to at least one quality parameter and secondly input parameters correlating with the quality parameter, wherein the data relating to the quality parameters in the dataset of the database are preferably measured values and/or values ascertained by way of laboratory cuts.

Preferably, the data and/or the dataset are normalized over time and/or to the length of the production installation and/or of an apparatus thereof. Normalization allows universal use of the dataset for a multiplicity of production installations, since normalization may be used to eliminate installation-specific circumstances.

Alternatively or preferably additionally, the data and/or the dataset are aggregated by forming data clusters. In particular the input parameters correlating with the quality parameters may be reduced by way of aggregation to obtain data clusters. Moreover, aggregation, in particular in conjunction with normalization of the data and/or of the datasets, may also result in a database that may be used for a multiplicity of production installations, since this likewise allows installation-specific circumstances to be eliminated in the data.

Advantageously, the dataset is formed from at least ten, preferably at least 20, particularly preferably at least 30, quality parameters and from at least 25, preferably at least 50, particularly preferably at least 100, input parameters correlating with the quality parameters. A multiplicity of quality parameters and input parameters correlating with these quality parameters improve the dataset overall, allowing ascertainment of not only one quality value but also of multiple quality values for different quality parameters. In particular, the dataset may also include a multiplicity of data clusters.

In yet another advantageous embodiment of the method, the database includes at least 100, preferably at least 500, particularly preferably at least 1000, datasets. A broad database containing a multiplicity of datasets firstly allows the algorithm based on artificial intelligence to be better trained, thereby improving the ascertainment of the quality value for the at least one quality parameter.

Preferably, the datasets of the database are in a form such that they map a broad range of data for the quality parameters and/or input parameters correlating with the quality parameters, in particular of variable product parameters, such as for example the setpoint board thickness of the material board to be produced. A broadly diversified database allows the algorithm based on artificial intelligence to be better trained in the training phase. The ascertainment of quality values is made possible by a broad database for a broad range of variable product parameters.

Preferably, the algorithm is checked using a test database, wherein the test database includes test datasets containing quality parameters and also input parameters correlating with the quality parameters, wherein the test datasets differ from the datasets of the database. The distinction between test datasets and datasets allows ascertainment of quality values for specific input parameters that have not been used to train the algorithm. To check the algorithm using the test database, the input parameters correlating with the quality parameters are used as a basis for ascertaining a quality value, the quality value ascertained for a quality parameter on the basis of the test dataset being compared with the quality parameter recorded in the test dataset. The algorithm is thus checked using the test database in order to ascertain whether the quality values ascertained for the at least one quality parameter by the algorithm substantially match the quality parameters recorded in the test dataset, the basis used therefor being the input parameters correlating with the quality parameter.

The quality value ascertained for the quality parameter using the algorithm should preferably substantially match the value of the quality parameter in the test dataset. The difference between the ascertained quality value and the value of the quality parameter in the test dataset should in particular be less than 10%, preferably less than 5%, particularly preferably less than 3%.

A difference between the ascertained quality value and the value of the quality parameter in the test dataset, in particular when differences are found for some of the test datasets or the entire test database, results in the algorithm based on artificial intelligence continuing to be trained, or even being trained from scratch, using a database that is extended compared to the database used for training. This improves the ascertainment of the quality value of the at least one quality parameter, which also further improves the reliability and validity of the algorithm based on artificial intelligence when ascertaining the quality value.

Preferably, the ascertained quality value is visualized. A visualization in this case may be provided for the user of the production installation, in particular in a control center of the production installation. It is also possible for the ascertained quality value to be visualized and queried by way of other computer programs or displays. By way of example, a visualization may be provided independently of location in the mat interface or on a mobile device. Visualization of the ascertained quality parameter means that for example a user or else a scientist with technological experience constantly has an eye on said quality parameter and may also take manual action if need be, for example in order to prevent a drop in the quality value or to further optimize the quality value.

Particularly preferably, an alteration in the input parameters, in particular an alteration of at least one product parameter, is first checked by means of the algorithm in respect of the ascertained quality value, in particular that the quality value is in a predetermined range. Before an alteration in the input parameters, the algorithm may thus be used to check the extent to which the alteration affects the quality value. In particular, before a change of product, for example the change from production of a thick material board to production of a thin material board, which is associated with the alteration of product parameters, it is therefore possible to simulate the extent to which the alteration affects the quality. The prior check allows the production installation to start more quickly or a change of product to take place more quickly.

One preferred embodiment of the method is distinguished in that the quality value is optimized in an optimization computer of the controller by means of the algorithm, and/or at least one other algorithm based on artificial intelligence, which has been formed by training using the database and/or another database.

Preferably, the quality value is optimized in the optimization computer by determining and optionally visualizing altered input parameters.

Optimization of the quality value is preferably understood to mean improving the quality value per se in combination with optimizing the quality of the material board. Furthermore, optimization of the quality value may preferably also involve a constant quality value being achieved with altered input parameters, in particular as a result of lower use of primary materials, auxiliaries and consumables, and/or a higher production level being made possible for a constant quality value.

The quality value is constantly optimized so that the ascertained quality value is in a predefined range, or does not fall short of a predefined minimum quality value. A lower limit for the quality value ensures that the material boards produced are of a minimum quality, which means that no rejects are produced. The minimum quality value may be predefined by a standard for the material boards, for example.

In the range of the quality value, said quality value may be optimized so that the quality value is improved and/or, as a result of material use being reduced, remains constant and/or is even reduced to a minimum value. Moreover, the quality value may also be optimized so that the quantity of material boards, the volume of material boards and/or the surface area of material boards per unit time is increased, these material boards having at least the minimum quality value.

In particular, the altered input parameters may be manually adopted by a user of the production installation in order to optimize the quality value, with the result that ultimately the user himself performs the optimization and the optimization computer merely gives suggestions for altered input parameters to optimize the quality value. The altered input parameters are then output to the production installation and/or the apparatuses thereof, and physically altered as appropriate, by means of the controller.

Alternatively or preferably additionally, the altered input parameters ascertained in the optimization computer may be altered in the controller automatically after approval by the user or fully automatically without intervention by a person and may be output to the production installation and/or the apparatuses. Alteration of the input parameters in the controller requiring approval by a user allows the user to check the ascertained altered input parameters for plausibility again and, if necessary, to correct them on the basis of his experiences, the time of the alteration, in particular before a change of material board that is to be produced or the like. When the altered input parameters ascertained in the optimization computer are altered in the controller fully automatically, intervention by a user is no longer necessary in order to optimize the method for producing material boards.

In one preferred embodiment of the method, the optimization of the quality value is performed before and/or at the start of production and/or in particular during production. Optimization of the quality value before production is generally possible, as the quality value is ascertained by the algorithm on the basis of the input parameters, at least some of which may even be ascertained before the start of production already, in particular setpoint values. Parameters known before the start of production are for example the type of material used, the ambient conditions, the temperature of the heating plates in the press or the production speed.

Alternatively or preferably additionally, the optimization of the quality value is checked after a time interval. The optimization does not need to take place continually, therefore, especially since new altered input parameters would be determined continually in the optimization computer on the basis of varying input parameters. The time interval for checking the optimization of the quality value is for example 5 minutes, 10 minutes, 15 minutes, 30 minutes or, depending on the product, the production time for a specific product and the stability of the input parameters, more than 30 minutes.

Preferably, a difference between the ascertained quality value and a predefined setpoint value, or a setpoint value range, results in a warning being output. As soon as the ascertained quality value is no longer in a setpoint value range, an action should be taken by the user of the production installation or measures should be taken by the controller itself, since otherwise there is the risk of rejects being produced. The user is able to modify input parameters manually or to use the optimization computer to produce altered input parameters, and to adopt said parameters in order to return the quality value to the setpoint value range. The warning may also have an associated request or suggestion to alter the input parameters.

Alternatively or preferably additionally, optimization-determined adherence to the quality value in the setpoint value range given altered input parameters results in a message being output, the altered input parameters in particular being displayed to the user. The quality value in the setpoint value range may thus be optimized in such a way that in particular material use as a whole, in particular the use of primary materials, auxiliaries and consumables, may be reduced and/or the output of material boards per unit time may be increased, without the ascertained quality value leaving the setpoint value range. The user is again able to manually alter the altered input parameters for adhering to the quality value in the setpoint value range in the controller and/or to have the ascertained altered input parameters transmitted to the controller automatically. Alternatively, the message may be in a form for a user such that the altered input parameters are adjusted fully automatically.

One preferred embodiment of the method is distinguished in that a physical model, in particular a mathematical description of one or more running processes in the course of the production of material boards, is incorporated into the algorithm to ascertain the quality value and in particular is changed. The physical model may therefore form a starting point for the algorithm, the model being able to be changed, in particular optimized, in the course of the training of the algorithm. The physical model may in particular include only fundamental physical relationships, in particular only in regard to one apparatus. Already existing knowledge may therefore be taken as a basis for using the algorithm to ascertain new relationships that a technologist or mathematician has not thought about when ascertaining the physical model. Alternatively or additionally, the model may be a secondary condition.

Another preferred embodiment of the method is distinguished in that a detailed physical model is substantially dispensed with for ascertaining the quality value. The present method is thus based on the production of material boards by way of the algorithm distinctly not being recreated on the basis of a physical model, but rather the algorithm based on artificial intelligence being produced purely by way of the training using the database. This has the advantage in particular that the present invention also allows ascertainment of relationships between quality parameters and input parameters correlating with the quality parameters that a technologist or mathematician has not thought about when recreating the physical model. The physical model thus has the disadvantage that only the ascertained and known relationships may be recreated, but it is not necessarily possible to ascertain new relationships between the quality parameters and input parameters correlating with the quality parameters.

Preferably, multiple algorithms, in particular based on artificial intelligence, are used to ascertain the quality value for the at least one quality parameter simultaneously and/or in succession. In particular when multiple algorithms are used simultaneously, the quality value may be ascertained in different ways and the ascertained quality values may be compared with one another as appropriate. The comparison permits an analysis for example of what basis is best suited to the algorithm.

Preferably, the quality values ascertained by the different algorithms are offset against one another, for example by way of averaging or by means of statistical models. Offsetting allows the ascertainment of the quality value to be improved even further, since said quality value is based on different algorithms and thus specific weaknesses of the different algorithms may be reduced or even eliminated completely by the offsetting. In particular, a combined result for the ascertained quality value is produced and/or is used as a basis for optimizing the quality value.

More preferably, a graphics card is used in the optimization computer, preferably in the controller of the production installation. The use of a graphics card in the optimization computer allows the optimization to be speeded up, which means that a quality value for the at least one quality parameter may be ascertained more quickly.

More preferably, the installation parameters and/or material parameters are acquired by means of sensors. The sensors in this case are able to measure the installation parameters and/or material parameters directly or ascertained by way of calculation by means of the parameters acquired by the sensors.

Preferably, information relating to wear and/or abnormal behavior is derived from the input parameters and/or is forecast and in particular visualized by means of the algorithm. To forecast wear by means of the algorithm, the database, in particular the dataset, also includes information relating to abnormal behavior and/or wear for specific apparatuses and/or installation parts. In particular, the forecast information relating to wear and/or abnormal behavior is used for state monitoring and/or predictive maintenance detection and/or failure detection.

In a still more preferred embodiment of the method, the algorithm is checked before and/or during ongoing production, preferably by comparing the ascertained quality value with a measured value of the quality parameter of the material board. The algorithm based on artificial intelligence, by means of which a quality value is ascertained, may thus also be checked during ongoing operation and in particular during ongoing production of material boards. Optionally, if a difference between the ascertained quality values and the measured values for the quality parameter is detected that is above a stipulated threshold value, the algorithm is retrained. The algorithm may thus be continually improved during the method.

Preferably, the at least one algorithm and/or at least one dataset of the production installation and/or the database are transmitted and/or received by way of an interface. The interface in this case may allow transmission of information and/or data within the system used by the manufacturer of the material board, for example to a cloud data storage or a memory. The interface may preferably also be in a form such that it allows information to be sent to the manufacturer of the production installation or apparatuses thereof and also information to be received from the manufacturer of the production installation or apparatuses thereof. In particular in the case of an interface to the manufacturer of the production installation, a broad database containing a multiplicity of datasets for training the algorithm may be provided by the manufacturer and/or an already known algorithm may be sent to the controller of the production installation as a starting point for training.

Preferably, there is provision in the production installation for apparatuses for comminuting, sorting, adjusting the mix ratios of the material, providing a binder, gluing, storing, air-conditioning the material, for weighing, for monitoring and/or for examining the material or the mat, for prepressing, for adjusting the moisture, temperature, width and/or height of the mat, for measuring parameters of the products and materials and product parameters and/or quality parameters of the material board, for controlling the temperature of the material board or the like.

Another solution that is specified is a production installation for producing material boards that have specific quality parameters, wherein the production installation comprises at least apparatuses for forming a mat from a material and pressing said material to obtain material boards and preferably for gluing the material before it is formed to obtain the mat. The production installation and/or the apparatuses thereof include a controller having a programmable logic controller for controlling or regulating the production installation and/or the apparatuses thereof, wherein the controller can be used to receive, process and/or output input parameters.

The production installation is distinguished in that the input parameters are formed at least from variable product parameters for the material board that is to be produced, from variable and/or acquirable installation parameters of the production installation and/or of the apparatuses thereof and/or from acquirable material parameters, and in that the controller is designed to use an algorithm based on artificial intelligence to ascertain a quality value relating to at least one quality parameter on the basis of the input parameters, the algorithm being trainable, or formable, by means of a database that includes at least one quality parameter and input parameters correlating with the quality parameter.

Ascertainment of the quality value on the basis of the input parameters is thus based purely on an algorithm that substantially dispenses with recreating the physical processes and thus with a predefined mathematical description of the physical processes, since the algorithm is merely based on a mathematical method and the training by way of the database.

Preferably, the input parameters, in particular each input parameter, have an attributed time value and/or position value. Attributing the time value to an input parameter allows for example the material flow for the material to be at least tracked. Furthermore, attributing a time value to the input parameter allows the relevant material parameters ascertained or measured earlier to be appropriately attributed to the material pressed to obtain a material board. The position value may be used to acquire input parameters relating to a specific position within the production installation and/or the apparatuses.

Alternatively or preferably additionally, the installation includes a display on which the ascertained quality value of the quality parameter is displayable. Thus, the ascertained quality value may be displayed to a user of the installation, to a technologist of the installation or else to the installation operator at any time. The display may be for example a screen in the control center of the production installation, but also a mobile terminal, for example a tablet or smartphone, that is arranged on the installation.

Preferably, the installation includes an interface for accessing the database and/or for transferring information containing a user of the production installation, a manufacturer of the production installation, a different production installation and/or a cloud data storage. The interface may thus be used to send data from the production installation and/or the apparatuses thereof to the manufacturer of the production installation and/or of the apparatuses, for example, and to receive said data. Moreover, an interface permits specific data, such as for example the database and/or the algorithm already trained using the database, to be transmitted to the production installation, in particular to the controller, securely and quickly.

Particularly preferably, the input parameters are normalized, the input parameters preferably being normalized over time and/or to the length of the production installation and/or of an apparatus. Normalization improves the comparability of data of the input parameters, which allows system-specific, installation-specific and/or method-specific influences to be eliminated. By way of example, the input parameters concerning the press, or the apparatus for pressing, may be normalized for a continuously operating press over the length of this press. This allows in particular the influence of the press length, which may vary between 20 and 70 m, for example, to be substantially eliminated from the input parameters.

Alternatively or preferably additionally, the input parameters are aggregated, the input parameters preferably being aggregated by forming clusters, in particular within an apparatus of the production installation. Aggregation allows the comparability of the input parameters to be increased further, the volume of data being reduced at the same time. Again taking the example of a press, the input parameters may be aggregated for example into one or more clusters for the inlet area, the high-pressure area and the outlet area.

Aggregation and/or normalization moreover allows the applicable parameters to be also ported to production installations of the same or a similar type, since installation-specific peculiarities may be eliminated thereby.

In another embodiment, the database includes at least one dataset, wherein the dataset includes data containing quality parameters and input parameters correlating with the quality parameters, and wherein in particular one dataset is distinguishable from another dataset of the database in at least one quality parameter and/or in at least one input parameter correlating with the at least one quality parameter. Preferably, the database includes as broad as possible a spectrum of quality parameters and input parameters correlating with the quality parameters, with the result that the quality value is able to be ascertained by means of the algorithm over a very broad spectrum of quality parameters, or product parameters. When multiple datasets are used, which is preferred, the datasets should differ at least in one parameter, since otherwise the algorithm cannot be trained effectively.

Preferably, the data and/or datasets are normalized over time and/or to the length of the production installation and/or of an apparatus and/or are aggregated by forming data clusters. The normalization allows a homogeneous database having comparable quality parameters, or input parameters correlating with the quality parameters. Here too, aggregation of the respective parameters to obtain data clusters may result in a reduction in the volume of data, which allows the training to be speeded up. Aggregation and/or normalization moreover allows the applicable data to be also ported to production installations of the same or a similar type, since installation-specific peculiarities may be eliminated.

Advantageously, a dataset of the database includes at least ten, preferably at least 20, particularly preferably at least 30, quality parameters and at least 25, preferably at least 50, particularly preferably at least 100, input parameters correlating with the quality parameters. A broad database containing a dataset comprising a multiplicity of quality parameters and input parameters correlating with the quality parameters allows the algorithm to be better trained by means of the database, thereby also improving the ascertainment of the quality value.

Preferably, the database includes at least 100, preferably at least 500, particularly preferably at least 1000, datasets.

One advantageous embodiment of the production installation is distinguished in that the algorithm is checkable using a test database, wherein the test database includes test datasets containing quality parameters and also input parameters correlating with the quality parameters, and wherein the test datasets are distinguishable from the datasets of the database. The test database may thus be used to check the algorithm, to which end the input parameters correlating with the quality parameters are predefined in the controller and the ascertained quality value for a quality parameter is compared with the value of the quality parameter in the test dataset. If a difference is found between the ascertained quality value and the value of the quality parameter in the test database, for example given a difference of greater than 5%, in particular for multiple test datasets, then the algorithm may be retrained using an extended database or trained again using another database, which is different than the database.

Preferably, an alteration in the input parameters, in particular the alteration of at least one product parameter, and an effect thereof on the ascertained quality value are simulable in the controller by means of the algorithm. It is thus possible for scheduled alterations to be simulated first and for effects on the quality value to be detected in advance, said effects in particular being able to be prevented immediately for the alteration, meaning that material board rejects are reduced for a changeover.

Preferably, the controller further includes an optimization computer by means of which at least one quality value is optimized on the basis of the algorithm and/or another algorithm based on artificial intelligence. The quality value may be optimized so that the quality value per se is improved or that optimization is performed so that an almost identical quality value is achievable for lower resource use. In particular, optimization may also be performed so that the quality value is optimized in such a way that it is close to or at a minimum value, allowing a reduction in resource use as a whole and/or a higher output of material boards per unit time to be achieved.

Particularly preferably, altered input parameters are determinable and optionally visualizable for the optimized quality value in the optimization computer. Determination is performed in the optimization computer for altered input parameters that lead to an optimized quality value. In this case, the optimization computer is able to suggest altered input parameters only for certain apparatuses of the production installation and/or for the entire production installation, wherein specific predefined input parameters, such as for example press length, environmental parameters or material type, are not alterable by the optimization computer, or, although they are taken into account by the optimization computer, are regarded as unalterable input parameters.

In particular, the altered input parameters are alterable in the controller manually by a user of the production installation, automatically after approval by the user and/or fully automatically and are able to be output to the production installation and/or the apparatuses. As a result, various modes are provided for the production installation regarding how, ultimately, an alteration, or optimization, of the quality value is supposed to be dealt with. If the altered input parameters for an optimum quality value are displayable only visually, the user can scrutinize them based on his technical knowledge and, if necessary, alter the altered input parameters manually in the controller before they are output to the production installation and/or the apparatuses and appropriate parameter alterations are engaged. In the case of automatic alteration of the input parameters in the controller, the user may merely give approval for the optimization, but may not necessarily also alter other parameters.

Particularly preferably, the optimized altered input parameters may also be altered in the controller fully automatically and output to the production installation, or the apparatuses, as a result of which the production installation itself is thus optimized on the basis of the algorithm and the input parameters without requiring action by a user or technologist.

In one advantageous configuration, multiple algorithms are designed to produce the quality value simultaneously and/or in succession.

Alternatively or preferably additionally, an interface for revising and/or normalizing the results is arranged in the optimization computer.

Preferably, the at least one algorithm is able to be produced on a method or a modification thereof from the following group: simple methods, such as for example linear regression, polynomial regression, functional regression; and/or advanced methods, such as for example random forest regression, support vector regression, K nearest neighbors regression, neural networks, recurrent neural networks, convolutional neural networks, residual networks, Bayesian networks; and/or classification-based methods, such as for example K nearest neighbors classification, decision trees, random forests, naive Bayes, support vector machines.

Particularly preferably, the controller and/or the optimization computer includes a graphics card, as a result of which the processing of the data may be carried out in an accelerated manner and faster.

Preferably, at least one comminuting apparatus, a sorting apparatus, an adjusting apparatus for the mix ratio within the material, at least one provisioning apparatus for the binder, a storage apparatus, a measuring apparatus for measuring a property of the material and/or the mat and/or the material boards, an examination apparatus and/or like apparatuses are arranged in the production installation.

One advantageous embodiment of the production installation is distinguished in that a difference between the ascertained quality value for the at least one quality parameter and a setpoint value, or a setpoint value range, may result in a warning being output by means of the controller and/or the optimization computer being switched on. This means that as soon as the quality value leaves a predefined setpoint value range, or falls short of at least one minimum quality value, it is possible to output a warning that the current production is highly likely to result in rejects and thus unusable material boards. A user of the installation may react to this manually by reducing specific input parameters, such as for example the production speed and/or the pressure in the press, and/or shutting down specific apparatuses. Particularly preferably, a warning results in the optimization computer being switched on, as a result of which the quality value is optimized on the basis of the algorithm and the currently provided input parameters so that no rejects are produced.

It is particularly advantageous that the controller, in particular the optimization computer, is retrofittable. It is thus possible to ascertain a quality value for a quality parameter even in the case of existing production installations and/or apparatuses of such an installation.

Yet another solution that is specified is a computer program product having a computer-readable storage medium on which commands are embedded that, when executed by a controller, cause the controller to be configured to perform a method for producing material boards as presented above or an advantageous embodiment thereof, in particular in a production installation as presented above or an advantageous embodiment of the production installation.

Furthermore, yet another solution that is proposed is the use of a computer program product as presented above in a production installation for producing material boards from lignocellulosic material, in particular wood, and/or from recycling material and/or from plastic.

BRIEF DESCRIPTION OF THE DRAWINGS

Further advantageous embodiments of the method for producing material boards and of the production installation for producing material boards are presented in the figures that follow, in which:

FIG. 2 shows a flow diagram for training an algorithm by means of a database;

FIG. 3 shows a flow diagram for the method according to the invention for ascertaining and visualizing an ascertained quality value; and FIG. 4 shows a flow diagram for optimizing the quality value in the course of the production of material boards.

DETAILED DESCRIPTION

Figure 1:
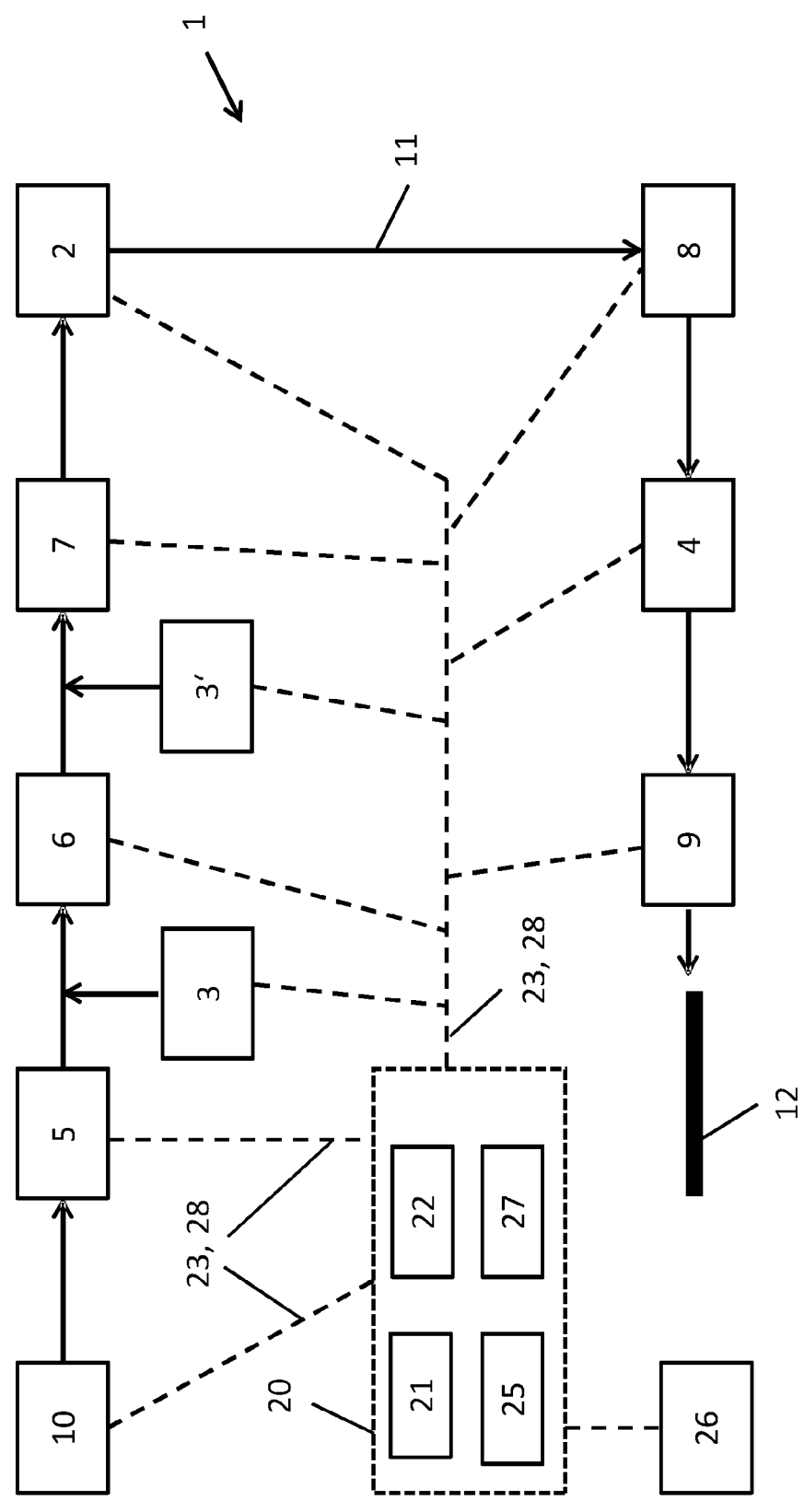
FIG. 1 shows a basic representation of a production installation for producing material boards.

In the text that follows, identical reference signs denote identical or at least identically acting parts.

FIG. 1 shows, merely schematically, a production installation 1 according to the invention for producing material boards 12. The production installation 1 in this case includes multiple apparatuses 2, 3, 4, 5, 6, 7, 8, 9 through which the material 10 passes in order to be ultimately pressed to obtain a material board 12.

The material 10 consists primarily of a plant-based primary material, in particular wood, that is delivered to the production installation 1. Besides wood as the material 10, other lignocellulosic materials, recycling materials, for example recycling wood or recycled plastic, or plastics may be processed directly as the material 10 in the installation. In addition, the material 10 may also consist of a mixture of different materials, for example green wood and recycling wood and/or plastic.

In the production installation 1 shown, the material 10 provided is first of all added to an apparatus 5 for comminuting the material 10. By way of example, the apparatus 5 for comminuting may be a cutting device, a wood chipper or a knife ring flaker. The comminuted material 10 is subsequently delivered to an apparatus 6 for drying, in which the material 10 is dried to a predefined residual moisture for the further process. Upstream of the apparatus 6 for drying, the material 10 is mixed with a binder in an apparatus 3 for gluing. The use of a binder is dependent on the respective material 10. When plastics are used as the material 10, it may be possible to dispense with addition of a binder if appropriate, which means that a corresponding apparatus 3 for gluing is not required. Alternatively or additionally, as shown in FIG. 1, an apparatus 3' for gluing may also be arranged downstream of the apparatus 6 for drying. If appropriate, the material 10 may be re-glued once more in the downstream apparatus 3' for gluing after the apparatus 6 for drying.

The glued material 10 subsequently passes through an apparatus 7 for sorting, in which the material 10 is divided up into multiple fractions. In the present case, the material 10 is fractionated on the basis of the size of the comminuted material 10, with material 10 with a smaller particle size being separated from material 10 with a larger particle size and being delivered to separate processing lines or temporary stores. Fractionation of the material 10 in an apparatus 7 for sorting is aimed at improved production of the material board 12, which involves for example the material 10 with a smaller particle size being arranged on the outer faces of the flat sides of the material board 12 and coarser material 10 forming a middle layer of the material board 12.

Subsequently, the material 10 is delivered to an apparatus 2 for spreading the material 10. In this apparatus 2, the material 10 is spread on a forming belt to obtain a mat 11 or a web, the fractions of the material 10 being spread in layers, as a result of which the mat 11 has a layered structure. Alternatively, the material 10 may also be spread only in one layer on a forming belt. The mat 11 spread in this way subsequently passes through an apparatus 8 for pre-pressing, as shown in FIG. 1, in which the mat 11 is pre-pressed. The mat 11 is thus firstly compressed and secondly vented in the apparatus 8, allowing improved pressing of the mat 11 to obtain the material board 12 in the apparatus 4 for pressing. Depending on the material 10 used, for example the use of plastic as the material 10, an apparatus 8 for pre-pressing may not be required.

In the apparatus 4 for pressing, which is in the form of a continuously operating press in the present case, the mat 11 is exposed to pressure and heat, as a result of which the binder in the mat 11 sets and the material board 12, or a continuous material board strand, is formed at the end of the apparatus 4 for pressing. Arranged upstream of the apparatus 4 for pressing, there may also be a further apparatus for preheating the mat 11, for example by means of steam or microwave radiation, if appropriate. The continuous material board strand exiting the apparatus 4 is subsequently divided up by means of diagonal saws in an apparatus 9 for separating, as a result of which material boards 12 of desired length are formed. The material boards 12 thus formed are subsequently cooled, stacked and delivered to a storage site or to immediate further processing.

The production installation 1 further includes a controller 20 that is directly connected to the individual apparatuses 2 to 9 of the production installation 1 and to further apparatuses, for example measuring apparatuses or temperature sensors. The controller 20 in this case includes a programmable logic controller 21, by means of which the production installation 1 and the apparatuses 2 to 9 are controlled or regulated. The operational connection of the controller 20 to the individual apparatuses 2 to 9 of the production installation 1 is used to acquire input parameters 23 in the controller 20 and to transfer altered input parameters 28 to the production installation 1, or to the individual apparatuses 2 to 9. The input parameters 23 are setpoint values and actual values of installation parameters of the production installation 1 and of the apparatus 2 to 9. In the present case, these are for example the temperature in the apparatus 6 for drying, the fill levels of temporary stores, the pressing speed at which the mat 11 is pressed in the apparatus 4 or the temperatures and pressures in the apparatus 4. Some of the installation parameters are acquired by sensors on the individual apparatuses 2 to 9 or are formed by fixed parameters that characterize the individual apparatuses 2 to 9 and the production installation 1. Fixed installation parameters are for example the press length of the continuously operating press as the apparatus 4 for pressing, the number of spreading units in the apparatus 2 for spreading or the number of fractions in the apparatus 7 for sorting.

Besides the installation parameters, the material parameters also form further input parameters 23 that are incorporated into the controller 20. The material parameters are the type of material 10 used, the residual moisture of the material 10 after the apparatus 6 for drying, the binder used in the apparatus 3 for gluing, or the height and width of the spread mat 11 in and/or after the apparatus 2 for spreading.

Finally, other input parameters 23 may also be predefined by a user. As such, product parameters characterizing the material board 12 are likewise input parameters 23. The product parameters are predefined parameters of the material board 12 that is supposed to be produced in the production installation 1. Certain minimum requirements for the material board 12 are thus stipulated using the product parameters, which are likewise incorporated into the controller 20. The product parameters are the type of material board to be produced or the thickness of the material board 12 to be produced.

The controller 20 is designed such that it is able to receive and process input parameters 23 and also to output altered input parameters 28 to the apparatuses 2 to 9 of the production installation 1. In addition, the controller 20 is designed such that a quality value 24 is ascertained in the controller 20 on the basis of the input parameters 23 and is displayed to a user or technologist of the production installation 1 on a display 26. In addition, the controller 20 includes an optimization computer 22 that is used to optimize the ascertained quality value 24. An interface 25 is used to send the parameters acquired in the controller 20 to other apparatuses, such as for example a memory 27, other displays, or a cloud data storage. Furthermore, the interface 25 is also used to make a connection to a system of the manufacturer of the production installation 1 and/or of apparatuses 2 to 9 of the production installation 1, which connection is used to send data of the production installation 1 and/or of the apparatuses 2 to 9 and to transmit data such as the database 30 or a pre-trained algorithms 32 to the controller 20. The interface 25 may also be used by the controller 20 to receive data, in particular datasets or test datasets, information and/or parameters from other production installations 1, in particular if the manufacturer of the material boards 12 operates multiple production installations 1.

FIG. 2 schematically shows the sequence for forming and training an algorithm 32 based on artificial intelligence to ascertain at least one quality value 24 of a quality parameter. To produce the algorithm 32, a method on which the algorithm 32 is based is first of all stipulated in the controller 20 or selected from a list. In the present case, this involves resorting to the method of neural networks as the basis for the algorithm 32. In order to be able to use the algorithm 32 to ascertain, or forecast, a quality value 24 for a quality parameter, it is necessary for the algorithm 32 to be trained. A database 30 that includes a multiplicity of datasets, in the present case at least over 500, is provided for training the algorithm 32. The individual datasets of the database 30 include details relating to quality parameters and input parameters correlating with the quality parameters. As such, a dataset of the database 30 reflects information for a material board 12 for which the input parameters and the quality parameters are known. The multiplicity of datasets in the database 30 are in a form such that they differ in at least one parameter, a quality parameter or an input parameter correlating with the quality parameter. Moreover, the datasets of the database 30 are designed such that they cover as broad as possible a spectrum of product parameters in regard to data relating to the product parameters, which form a subgroup of the input parameters. For material boards 12, the product parameters, which are supposed to cover as broad as possible a spectrum of product parameters, are provided by the board thickness of the material board 12 and the type of material boards 12. It is thus possible to ensure that the algorithm 32 trained by way of the database 30 allows reliable ascertainment of a quality value 24 for a quality parameter, and beyond, over as broad as possible a spectrum of product parameters.

Before the algorithm 32 is trained using the database 30, the data of the database 30 are normalized and aggregated in a processing step 31, as shown schematically by the dashed arrow in FIG. 2. Processing of the data of the database 30 by means of normalization and aggregation may also be carried out for particular individual datasets before they are delivered to the database 30.

The datasets, or data, in the database 30 are based on historical data of the production installation 1 that are stored in particular locally in situ in a memory 27 of the controller 20. Besides the locally available data for forming a database 30, the database 30 also includes datasets from other production installations, which are sent by way of an interface 25. The datasets from other production installations are provided and sent by way of the interface 25 by the manufacturer of the production installation 1. If the manufacturer of material boards 12 has multiple production installations 1, datasets for the database 30 may also be provided by these production installations 1.

In the processing 31, data clusters are formed within the available data in order to reduce the volume of data. The aggregation is carried out by way of interpolation, extrapolation or averaging. Moreover, the data are normalized to a statistical mean of zero and a standard deviation of one. After the processing 31 of the database 30, the algorithm 32 is finally trained using the database 30, which includes aggregated and normalized datasets after the processing 31.

When the training of the algorithm 32 using the database 30 has concluded, a further step involves the algorithm 32 formed being verified using a test database 33. The test database 33 in turn includes test datasets, which are of analogous design to the datasets of the database 30. Prior to their being used, the test datasets of the test database 33 have likewise undergone processing in which the test datasets of the test database 33 were normalized and aggregated.

The input parameters recorded in the test datasets of the test database 33 and correlating with the quality parameters are predefined for the algorithm 32 as input parameters, as a result of which said algorithm takes these input parameters as a basis for ascertaining a quality value 24 for at least one quality parameter. In particular, the algorithm 32 is used to ascertain quality values 24 for multiple quality parameters. While the algorithm 32 is being checked, quality values 24 are ascertained for quality parameters recorded in the test datasets of the test database 33.

The quality values 24 now ascertained by means of the algorithm 32 are subsequently compared with the data relating to the quality parameters recorded for the applicable test dataset in the test database 33. If the quality values are in a predefined range, in the present case differ from the test dataset by less than 5% of the data of the quality values, the algorithm 32 continues to be checked using further test datasets of the test database 33. If only slight differences between the ascertained quality value 24 and the data recorded in the test database 33, or in the test datasets, are found for the entire test database 33 overall, the checking of the algorithm 32 is complete and said algorithm is used in the controller 20 of the production installation 1 to ascertain quality values 24.

If, by means of the test database 33, there are larger differences between the data recorded in the test database 33, or in the test datasets, for the quality parameters and the quality values 24 ascertained by the algorithm, the algorithm 32 is retrained or even fundamentally reconstructed by means of an extended database 30, reconstruction of the algorithm 32 possibly involving the latter also being based on a different method, for example K nearest neighbors regression.

After the algorithm 32 has been retrained or formed from scratch, it is again checked using a test database 33 and finally used in the controller 20 to produce material boards 12 in a production installation 1, provided that the check using the test database 33 has in turn yielded the smallest possible difference in the quality values 24.

FIG. 3 schematically shows the sequence for ascertaining a quality value 24 in the controller 20 of the production installation 1 for at least one quality parameter in the course of the production of material boards 12. To ascertain the quality value 24 for multiple quality parameters, input parameters 23 are first of all input into the controller 20 or flow into the latter from the production installation 1 and the apparatuses of the production installation 2 to 9. The input parameters 23 include preset product parameters, including the board thickness and the type of material board 12 to be produced, material parameters, including the mix ratio of green and recycling material for the material 10 used and the type of binder, in the present case PMDI, and installation parameters, including sensor data from the individual apparatuses 2 to 9 of the production installation 1 and preset parameters of specific apparatuses 2 to 9.

On the basis of these input parameters 23, the algorithm 32, which has been trained and checked as previously illustrated in FIG. 2, ascertains quality values 24 for different quality parameters, which are displayed to a user of the production installation 1 on a display 26. The quality values 24 are ascertained by the algorithm 32 on an ongoing basis in this case, which means that the quality values 24 for the material board 12 being produced or needing to be produced are constantly displayed on the display 26. A message or warning is furthermore output on the display 26 if the ascertained quality value 24 drops below or at least approaches a minimum quality value. The user of the production installation 1 is thus informed if there is the risk of material boards 12 being produced that no longer comply with the predefined values for the quality parameters, which ultimately means rejects. The user should react to the warning or message by manually modifying input parameters 23 such as the production speed or the pressure in the apparatus 4 for pressing.

Besides a display 26 for a user of the production installation 1 that is arranged in the control center of the production installation 1, the quality values 24 may also be retrieved and displayed on other displays, for example a display on the installation or on a tablet or smartphone.

The input parameters 23 provided for ascertaining the quality values 24, and also the ascertained quality values 24, are stored as a production dataset in a memory 27, which allows the ascertained quality values 24 to be documented for the input parameters and, if necessary, checked by way of values that are later measured for the quality parameters. A corresponding production dataset, including the ascertained quality values 24 and the correlating input parameters 23 for this ascertained quality value 24, is stored manually as required or on an ongoing basis after a predetermined interval, for example every second or before and/or after a specific event, such as for example a change of product, the production datasets being sent to the manufacturer of the production installation 1 by way of the interface 25. The interface 25 may also be used to send the applicable production datasets to other production installations 1 of the manufacturer. Moreover, storage of the production datasets, including the quality values 24 and input parameters 23 correlating with these quality values 24, results in logging being performed for the quality of the material boards 12 produced. The data of the production datasets may furthermore be normalized and/or aggregated. Aggregation and/or normalization also allows the applicable data of the production datasets to be ported to production installations of identical or similar type.

FIG. 4 schematically shows the optimization of an ascertained quality value 24 in the controller 20. As already presented in FIG. 3, input parameters 23 flow into the algorithm 32, which the algorithm 32 takes as a basis for ascertaining one or more quality values 24. This ascertained quality value 24 is now transferred to an optimization computer 22, which includes a further algorithm 34 by means of which the ascertained quality value 24 is optimized. In the present case, the algorithm 34 is an algorithm that is of identical design and form to the algorithm 32.

Alternatively, the algorithm 34 may be different than the algorithm 32. For this, the algorithm 34 is, as already presented above in FIG. 2 in relation to the algorithm 32, trained by means of a database and, if necessary, checked and verified using a test database.

The optimization of the quality value 24 in the optimization computer 22 is subject to specific boundary conditions in this case that are predefined by a user or are already recorded in the algorithm 34.

Optimization of the quality value 24 in this instance may be based on diverse aspects. In the present case, the optimization computer 22 is designed such that the quality value 24 per se is optimized and improved. The aim is therefore to produce a material board 12 of the highest possible quality.

The quality value 24 may also be optimized so that the quality value 24 is maintained but alteration of the input parameters 23 to achieve the quality value 24 means that lower use of primary materials, auxiliaries and consumables is necessary or a higher output of material boards 12 per unit time becomes possible. Thus, for constant quality, indicated by an approximately constant quality parameter 24, the use of resources will be decreased, rendering the production of material boards 12 cheaper.

Furthermore, the quality value 24 may also be optimized in the optimization computer 22 so that the quality value 24 is reduced to a minimum value, allowing the use of primary materials, auxiliaries and consumables to be reduced further. The material boards 12 therefore meet minimum requirements, while at the same time the use of resources is reduced and the material boards 12 are able to be produced more cheaply.

Optimization of the quality value 24 in the optimization computer 22 involves the algorithm 34 ascertaining altered input parameters 28 on the basis of which the desired quality value is supposed to be achievable. The ascertained altered input parameters 28 are then displayed to a user of the production installation 1 on the display 26 by virtue of a message being output on the display 26. The user will then check the altered input parameters 28, correct them if necessary and send them to the programmable logic controller 21, or enter them manually there. The programmable logic controller 21 transfers the ascertained altered input parameters 28 to the production installation 1, or the apparatuses 2 to 9 of the production installation 1, and engages them there as appropriate. A transfer of the applicable altered input parameters 28 is shown by dashed lines in FIG. 4. However, the user may also refrain from optimizing the quality value 24 by way of the ascertained altered input parameters 28, for example if he is aware of circumstances such as imminent maintenance or a change of product and optimization would therefore no longer be expedient.

Alternatively, the ascertained altered input parameters 28 may be altered by the algorithm 34 directly in the programmable logic controller 21 and finally transferred to the production installation 1, or the apparatuses 2 to 9 of the production installation 1, to alter the respective settings. The altered input parameters 28 ascertained in the optimization computer 22 are thus used to continually and fully automatically optimize production of the material boards 12 in the production installation 1.

LIST OF REFERENCE SIGNS

1 production installation
2 apparatus for spreading
3, 3' apparatus for gluing
4 apparatus for pressing
5 apparatus for comminuting
6 apparatus for drying
7 apparatus for sorting
8 apparatus for pre-pressing
9 apparatus for separating
10 material
11 mat
12 material board
20 controller
21 programmable logic controller
22 optimization computer
23 input parameter
24 quality value
25 interface
26 display
27 memory
28 altered input parameters
30 database
31 processing
32 algorithm
33 test database
34 algorithm

The invention claimed is:

1. A method for producing a material board (12) in a production installation (1), comprising:
    forming, by a first subset of apparatuses (2, 3, 4, 5, 6, 7, 8, 9) of a production installation (1) based on a first subset of formed input parameters (23) and ascertained quality values (24), a material (10) into a mat (11) and pressing, by a second subset of the apparatuses (2, 3, 4, 5, 6, 7, 8, 9) of the production installation (1) based on a second subset of the formed input parameters (23) and the ascertained quality values (24), the mat (11) to produce a material board (12), wherein the apparatuses (2, 3, 4, 5, 6, 7, 8, 9) of the production installation (1) comprise one or more of
    temporary stores of the material (10),
    a drying stage,
    a spreading apparatus (2) comprising spreading heads,
    a gluing apparatus (3),
    a pressing apparatus (4) comprising cylinders and heating plates,
    a comminuting apparatus (5),
    a drying apparatus (6),
    a sorting apparatus (7),
    a pre-pressing apparatus (8), and
    a separating apparatus (9);
    measuring, by a first subset of measuring apparatuses of the production installation (1), first actual values of material parameters of the material (10);
    measuring, by a second subset of measuring apparatuses of the production installation (1), second actual values of installation parameters of the apparatuses (2, 3, 4, 5, 6, 7, 8, 9) and the production installation (1);
    acquiring, by an interface (25) of a controller (20) that is directly connected to each of the apparatuses (2, 3, 4, 5, 6, 7, 8, 9) and to each of the measuring apparatuses, the measured first actual values of the material parameters of the material (10) and the measured second actual values of the installation parameters of the apparatuses (2, 3, 4, 5, 6, 7, 8, 9) and the production installation (1),
    acquiring, by the interface (25) of the controller (20), first setpoint values of the material parameters of the material (10), second setpoint values of the installation parameters of the apparatuses (2, 3, 4, 5, 6, 7, 8, 9) and the production installation (1), and third setpoint values of product parameters of the material board (12) to be produced;
    forming, by the controller (20), input parameters (23) based on the acquired first setpoint values, the acquired second setpoint values, the acquired third setpoint values, the measured first actual values, and the measured second actual values, wherein each of the formed input parameters (23) comprises at least one of a respective time value or a respective position value;
    ascertaining, by the controller (20) using an artificial intelligence-based algorithm (32) and based on the formed input parameters (23), the quality values (24) of quality parameters of the material board (12), the algorithm (32) having been trained, or formed, by a database (30) stored in a memory (27) of the controller (20) and comprising at least one stored quality parameter and stored input parameters correlating with the at least one stored quality parameter; and
    transmitting, by the interface (25) of the controller (20), the formed input parameters (23) and the ascertained quality values (24) to the apparatuses (2, 3, 4, 5, 6, 7, 8, 9), controlling or regulating the apparatuses (2, 3, 4, 5, 6, 7, 8, 9) and producing the material board (12) based on the transmitted formed input parameters (23) and the ascertained quality values (24).

2. The method as claimed in claim 1, further comprising at least one of normalizing, by the controller (20), or aggregating, by the controller (20), the input parameters (23).

3. The method as claimed in claim 2, wherein at least one of (a) the normalizing of the input parameters (23) includes normalizing, by the controller (20), the input parameters over at least one of time or a length of at least one of the production installation (1) or one or more of the apparatuses (2, 3, 4, 5, 6, 7, 8, 9), or (b) the aggregating of the input parameters (23) includes forming, by the controller (20), clusters within one or more of the apparatuses (2, 3, 4, 5, 6, 7, 8, 9).

4. The method as claimed in claim 1, wherein the database (30) is formed at least from a dataset formed from data relating to the at least one stored quality parameter and the stored input parameters correlating with the at least one stored quality parameter, and the database includes at least an additional dataset, and the dataset differs from the additional dataset of the database (30) in at least one of the quality parameter or the input parameter correlating with the quality parameter.

5. The method as claimed in claim 4, wherein the data or the dataset are at least one of (a) normalized, by the controller (20), over at least one of time or to at least one of a length of the production installation (1) or one or more of the apparatuses (2, 3, 4, 5, 6, 7, 8, 9) or (b) aggregated, by the controller (20), by forming data clusters.

6. The method as claimed in claim 1, further comprising checking, by the controller (20), the artificial intelligence-based algorithm (32) using a test database (33) stored in the memory (27), wherein the test database (33) includes test datasets containing test quality parameters and test input parameters correlating with the test quality parameters, and wherein the test datasets differ from datasets of the database (30).

7. The method as claimed in claim 1, further comprising first checking, by the controller (20) using the artificial intelligence-based algorithm (32), an alteration in the input parameters (23) for an effect on the ascertained quality value (24).

8. The method as claimed in claim 1, further comprising optimizing, by an optimization computer (22) of the controller (20) using at least one of the artificial intelligence-based algorithm (32) or at least one other artificial intelligence-based algorithm (34), the ascertained quality values (24), the at least one other artificial intelligence-based algorithm (34) having been formed by training using at least one of the database (30) or another database.

9. The method as claimed in claim 8, wherein the optimizing the ascertained quality values (24) comprises visualizing altered input parameters (28).

10. The method as claimed in claim 8, wherein the optimizing the ascertained quality values (24) comprises optimizing the ascertained quality values (24) at least one of before production, at a start of production, during production, or after a predetermined time interval.

11. The method as claimed in claim 1, further comprising at least one of outputting, by the interface (25) to a display device of the production installation (1), a warning or switching on, by the controller (20), an optimization computer (22) upon a difference between the ascertained quality value (24) and a predefined setpoint value or a setpoint value range; or outputting, by the interface (25) to a display device of the production installation (1), a message if adherence to the quality value (24) in the setpoint value range is achieved based on altered input parameters (28), and displaying the altered input parameters (28) to a user.

12. The method as claimed in claim 1, wherein the algorithm (32) is based on or includes at least one method or a modification thereof from one of the following groups:
linear regression, polynomial regression, functional regression, K nearest neighbors regression, random forest regression, support vector regression, neural networks, recurrent neural networks, convolutional neural networks, residual networks, Bayesian networks, K nearest neighbors classification, decision trees, random forests, naive Bayes, or support vector machines.

13. The method as claimed in claim 1, wherein a physical model is incorporated into the algorithm (32) to ascertain the quality value (24).

14. The method as claimed in claim 1, wherein the algorithm includes multiple algorithms (32, 34) each configured to independently ascertain a predicted value for the quality value (24) for the at least one quality parameter.

15. The method as claimed in claim 14, wherein the predicted values independently ascertained by the multiple algorithms (32, 34) are at least one of offset against one another or compared, and a combined result is used as the quality value (24) for a basis for optimization.

16. The method as claimed in claim 1, further comprising at least one of (a) deriving, by the controller (20) using the artificial intelligence-based algorithm (32) and based on the formed input parameters (23), information relating to at least one of wear or abnormal behavior or (b) forecasting, by the controller (20) using the artificial intelligence-based algorithm (32) and based on the formed input parameters (23), information relating to at least one of wear or abnormal behavior for at least one of state monitoring, predictive maintenance detection, or failure detection.

17. The method as claimed in claim 1, further comprising checking, by the controller (20), the artificial intelligence-based algorithm (32) at least one of before or during ongoing production by comparing one of the ascertained quality values (24) with a measured quality value of the quality parameter of the material board (12), and if a difference between the one of the ascertained quality values (24) and the measured quality value is detected that is above a stipulated threshold value, retraining, by the controller (20), the artificial intelligence-based algorithm (32).

18. The method as claimed in claim 1, further comprising at least one of transmitting, by the interface (25), or receiving, by the interface (25), at least one of the artificial intelligence-based algorithm (32), at least one dataset of the production installation (1), or the database (30).

19. The method as claimed in claim 1, wherein the material parameters of the material (10) comprise one or more of
a type of the material (10),
a density of the material (10),
a moistness of the material (10),
a composition of the material (10),
a respective temperature of the material (10) in each of the temporary stores of the material (10),
a respective temperature of the material (10) in each of the temporary stores of the material (10),
a type and amount of binder used by the gluing apparatus (3),
an amount of binder used by the gluing apparatus (3), and
a temperature of the material (10) before entering the pressing apparatus (4).

20. The method as claimed in claim 1, wherein the installation parameters of the apparatuses (2, 3, 4, 5, 6, 7, 8, 9) and the production installation (1) comprise one or more of
a respective fill level of each of the temporary stores of the material (10),
a temperature of the drying stage for drying the material (10) before the forming of the material (10) into the mat (11),
a use and a type of preliminary heating for the mat (11),
a spreading width in which the mat (11) is spread by the spreading apparatus (2),
a number of the spreading heads of the spreading apparatus (2),
a press length of the pressing apparatus (4),
a respective pressing pressure of each of the cylinders of the pressing apparatus (4),
a respective temperature of each of the heating plates of the pressing apparatus (4),
respective power consumption values for each of the apparatuses (2, 3, 4, 5, 6, 7, 8, 9) and for the production installation (1),
a power consumption value for the production installation (1),
a room temperature of the production installation (1), and
an air humidity of the production installation (1).

21. The method as claimed in claim 1, wherein the product parameters of the material board (12) to be produced comprise one or more of a type of the material board (12) to be produced, a thickness of the material board (12) to be produced, and a strength of the material board (12) to be produced.

22. The method as claimed in claim 1, wherein the ascertained quality values (24) of the quality parameters of the material board (12) comprise one or more of a first strength value for a major axis of the material board (12), a second strength value for a minor axis of the material board (12), a first transverse tensile strength value for a major axis of the material board (12), a second transverse tensile strength value for a minor axis of the material board (12), a first modulus of elasticity value for a major axis of the material board (12), a second modulus of elasticity value for a minor axis of the material board (12), and a surface quality value of the material board (12).

23. The method as claimed in claim 1, the forming the material (10) into the mat (11) and pressing the mat (11) to produce the material board (12) comprising:

forming, by the first subset of apparatuses (2, 3, 4, 5, 6, 7, 8, 9) further based on altered input parameters (28), the material (10) into the mat (11) and pressing, by the second subset of the apparatuses (2, 3, 4, 5, 6, 7, 8, 9) further based on the altered input parameters (28), the mat (11) to produce the material board (12), and the method further comprising:

altering, by the controller (20) using the artificial intelligence-based algorithm (32) and based on the ascertained quality values (24), one or more of the formed input parameters (23) to form altered input parameters (28); and transmitting, by the interface (25) of the controller (20), the altered input parameters (28) to the apparatuses (2, 3, 4, 5, 6, 7, 8, 9) for controlling or regulating the apparatuses (2, 3, 4, 5, 6, 7, 8, 9) to produce the material board (12) further based on the altered input parameters (28).

24. The method as claimed in claim 1, the forming the input parameters (23) comprising forming, by a programmable logic controller (21) of the controller (20), the input parameters (23) based on the acquired first setpoint values; and the ascertaining the quality values (24) comprising ascertaining, by the programmable logic controller (21) of the controller (20) using the artificial intelligence-based algorithm (32) and based on the formed input parameters (23), the quality values (24) of the quality parameters of the material board (12).

25. A production installation (1) for producing material boards (12) that have specific quality parameters, the production installation (1) comprises:

apparatuses (2, 3, 4, 5, 6, 7, 8, 9) configured to glue, by a first subset of the apparatuses (2, 3, 4, 5, 6, 7, 8, 9) based on a first subset of formed input parameters (23) and ascertained quality values (24), a material (10), form, by a second subset of the apparatuses (2, 3, 4, 5, 6, 7, 8, 9) based on a second subset of the formed input parameters (23) and the ascertained quality values (24), a mat (11) from the glued material (10), and press, by a third subset of the apparatuses (2, 3, 4, 5, 6, 7, 8, 9) based on a third subset of the formed input parameters (23) and the ascertained quality values (24), the mat (11) to produce a material board (12), the apparatuses (2, 3, 4, 5, 6, 7, 8, 9) comprising one or more of temporary stores of the material (10), a drying stage, a spreading apparatus (2) comprising spreading heads, a gluing apparatus (3), a pressing apparatus (4) comprising cylinders and heating plates, a comminuting apparatus (5), a drying apparatus (6), a sorting apparatus (7), a pre-pressing apparatus (8), and a separating apparatus (9);

measuring apparatuses configured to measure, by a first subset of the measuring apparatuses, first actual values of material parameters of the material (10), and measure, by a second subset of the measuring apparatuses, second actual values of installation parameters of the apparatuses (2, 3, 4, 5, 6, 7, 8, 9) and the production installation (1); and a controller (20) that is directly connected to each of the apparatuses (2, 3, 4, 5, 6, 7, 8, 9) and to each of the measuring apparatuses, the controller (20) comprising an interface (25) and a memory (27), the controller (20) configured to acquire, by the interface (25), the measured first actual values of the material parameters of the material (10) and the measured second actual values of the installation parameters of the apparatuses (2, 3, 4, 5, 6, 7, 8, 9) and the production installation (1), acquire, by the interface (25), first setpoint values of the material parameters of the material (10), second setpoint values of the installation parameters of the apparatuses (2, 3, 4, 5, 6, 7, 8, 9) and the production installation (1), and third setpoint values of product parameters of the material board (12) to be produced, form input parameters (23) based on the acquired first setpoint values, the acquired second setpoint values, the acquired third setpoint values, the measured first actual values, and the measured second actual values, each of the formed input parameters (23) having at least one of an attributed time value or position value, ascertain, using an artificial intelligence-based algorithm (32) and based on the formed input parameters (23), the quality values (24) relating to quality parameters of the material board (12), the algorithm (32) being trainable, or formable, by a database (30) stored in the memory (27) and comprising at least one stored quality parameter and stored input parameters correlating with the at least one stored quality parameter, and transmit, by the interface (25), the formed input parameters (23) and the ascertained quality values (24) to the apparatuses (2, 3, 4, 5, 6, 7, 8, 9), controlling or regulating the apparatuses (2, 3, 4, 5, 6, 7, 8, 9) and producing the material board (12) based on the transmitted formed input parameters (23) and the ascertained quality values (24).

26. The production installation (1) as claimed in claim 25, the controller (20) further configured to at least one of normalize or aggregate the input parameters (23) over at least one of time or a length of at least one of the production installation (1) or one of the apparatuses (2, 3, 4, 5, 6, 7, 8, 9).

\*　\*　\*　\*　\*